United States Patent
Schiller

[15] 3,635,574
[45] Jan. 18, 1972

[54] CUTTING TOOL WITH INSERT CLAMP AND SEAT ARRANGEMENT

[72] Inventor: Adam A. Schiller, Waukesha, Wis.
[73] Assignee: Waukesha Cutting Tools, Inc., Waukesha, Wis.
[22] Filed: Apr. 2, 1970
[21] Appl. No.: 25,112

[52] U.S. Cl. ............................................. 408/197, 29/105 R
[51] Int. Cl. ............................................................. B23b 29/03
[58] Field of Search ....................... 29/105 R, 105 A; 408/197

[56] References Cited

UNITED STATES PATENTS

| | | | |
|---|---|---|---|
| 3,298,254 | 1/1967 | Vassallo | 77/58 R |
| 2,486,401 | 12/1969 | Kelm | 77/58 K |
| 1,273,752 | 7/1918 | Ebert | 77/58 E |
| 1,290,206 | 1/1919 | Howk | 77/58 D |
| 3,533,312 | 10/1970 | McCreery | 77/58 K |

Primary Examiner—Gerald A. Dost
Attorney—Andrus, Sceales, Starke & Sawall

[57] ABSTRACT

A rotary cutting tool having throwaway tool bits disposed in a slot in the tool head. A semicircular clamp is mounted in a groove in the slot wall and is tightened against the bit by a screw. Slide plates are disposed in the slot and are radially adjustable by a cam screw to provide adjustable seating for the bits.

6 Claims, 7 Drawing Figures

PATENTED JAN 18 1972
3,635,574
SHEET 1 OF 2
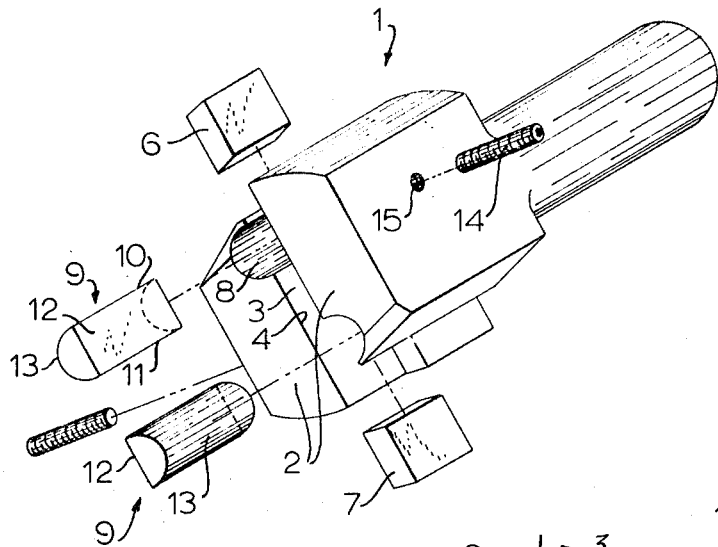
FIG_1
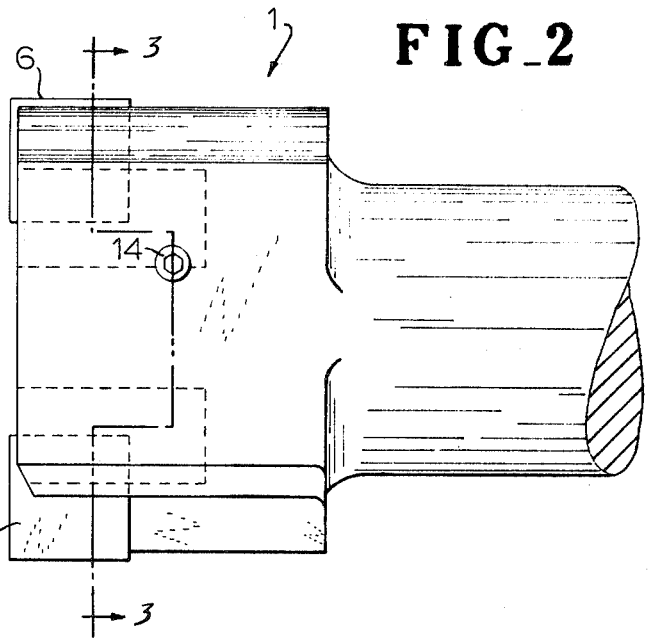
FIG_2
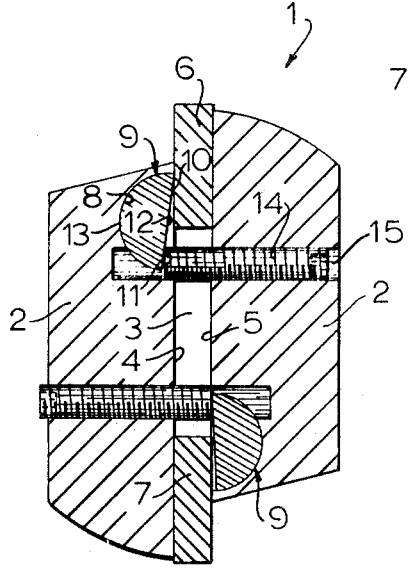
FIG_3
INVENTOR.
ADAM A. SCHILLER
BY
Andrus, Sceales, Starke & Sawall
Attorneys

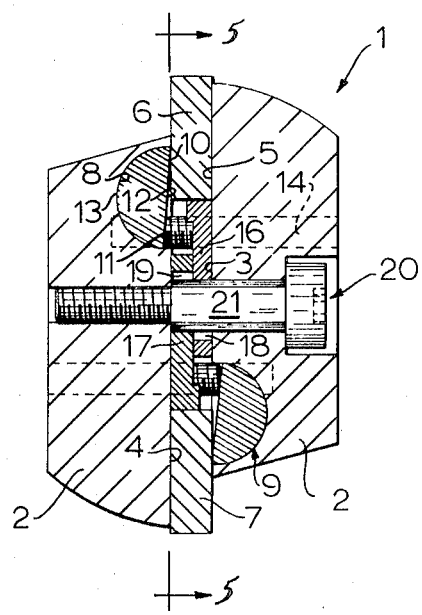
FIG_4
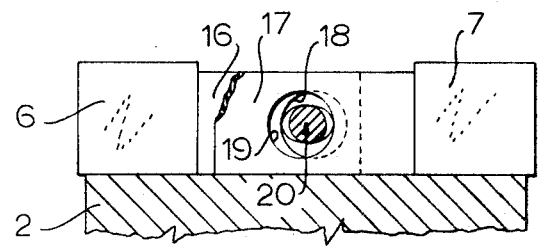
FIG_5
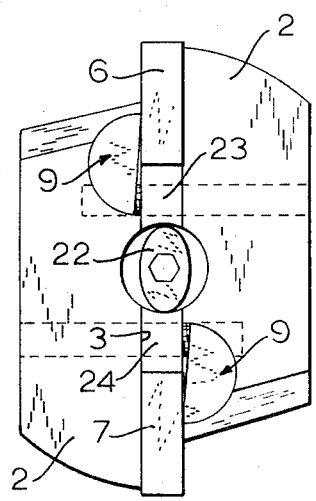
FIG_7
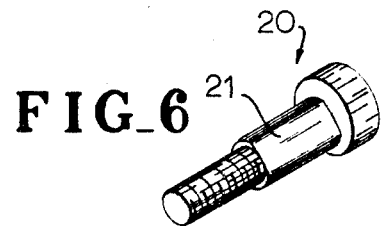
FIG_6
INVENTOR.
ADAM A. SCHILLER
BY
Andrus, Sceales, Starke & Sawall
Attorneys

CUTTING TOOL WITH INSERT CLAMP AND SEAT ARRANGEMENT

BACKGROUND OF THE INVENTION

This invention relates to a cutting tool, and more particularly to a rotary cutting tool for use in boring and the like, with provision for clamping and seating of one or more throwaway cutting inserts in the tool body.

SUMMARY OF THE INVENTION

The invention contemplates the utilization of a semicircular insert clamp having spaced edges joined by a flat front face and a curved rear surface, and which is disposed within the tool body. A tightening screw cams the clamp against the tool body and forces one clamp edge against the insert. A cam screw and slide plates provide adjustable seating for the inserts.

DESCRIPTION OF THE DRAWINGS

The accompanying drawings illustrate the best mode presently contemplated by the inventor for carrying out the invention.

In the drawings:

FIG. 1 is an exploded perspective view of a cutting tool constructed in accordance with the invention;

FIG. 2 is an enlarged fragmentary side elevation of the tool head portion;

FIG. 3 is a transverse section taken on line 3—3 of FIG. 2 and showing two positions of the clamp;

FIG. 4 is a view similar to FIG. 3, and showing one embodiment of radial adjustment means for the tool inserts;

FIG. 5 is a view taken on line 5—5 of FIG. 4;

FIG. 6 is a perspective view of the cam screw; and

FIG. 7 is a view similar to FIGS. 3 and 4, and showing another embodiment of adjustment means.

DESCRIPTION OF THE PREFERRED EMBODIMENT

As shown in the drawings, the invention is embodied in a tool comprising a tool body 1 having an inner end portion adapted to be secured to the spindle of a suitable rotary drive mechanism (not shown). The outer cutting end portion of tool body 1 is divided into two transversely offset head members 2 which are separated by a diametrical slot 3 forming opposed surface walls or faces 4 and 5.

Slot 3 is adapted to receive a pair of radially extending tool inserts or bits 6 and 7.

In accordance with the invention, means are provided to clamp the bits in position. For this purpose, and referring to bit 6, an equal longitudinally extending semicircular groove 8 is formed in face 4 and is spaced outwardly from the tool body axis and extends outwardly beyond the inner end of bit 6. Groove 8 is adapted to substantially wholly receive a clamp member 9 therein, which includes a pair of longitudinal edges 10 and 11 joined by a flat surface 12 and by a semicircular surface 13. Surface 13 is dimensioned to compliment groove 8 so that it matingly fits therein with surface 12 facing outwardly toward slot face 5. Tool bit 6 is therefore disposed therebetween.

A clamp screw 14 is disposed in a transverse threaded opening 15 in the head member 2, and its inner end faces the flat surface 12 of member 9 adjacent edge 11. Tightening of screw 14 against surface 12, causes member 9 to index or rotate in groove 8 until edge 10 tighteningly engages bit 6 to lock the latter against slot face 5 opposite groove 8, as shown in FIG. 3. Member 9 is thus confined between screw 14 and bit 6.

The structure for bit 7 is the same, only reversed, and FIG. 3 shows this bit before it is tightened.

While two bits and clamping mechanisms are shown, the invention contemplates the use of only one bit and clamp, or a plurality thereof, as required for a particular job.

In many instances, it is desirable to adjust bits 6, 7 to various radial positions for different boring diameters. FIGS. 4–6 show one embodiment of adjustment means usable with the clamp members. As shown, a pair of slide plates 16, 17 are disposed in slot 3 between bits 6, 7 and are provided with generally aligned openings 18, 19 respectively. A screw 20 having a cam surface 21 extends transversely through the axis of tool body 1 and normal to bits 6, 7 so that surface 21 is disposed within openings 18, 19. When the clamp members are loosened, turning of screw 20 will permit radial adjustment of bits 6, 7 which are seated on slide plates 16, 17, which in turn are seated through the aligned openings 18, 19 on cam surface 21.

A second embodiment of adjustment means is shown in FIG. 7, wherein a cam screw 22 extends axially of the tool body and provides a seat for a pair of separate slide plates 23, 24 on each side of screw 22 in slot 3.

The invention provides a unique structure for clamping and adjustably seating the tool bits of a rotary tool.

Various modes of carrying out the invention are contemplated as being within the scope of the following claims particularly pointing out and distinctly claiming the subject matter which is regarded as the invention.

I claim:

1. A cutting tool comprising:
   a. a tool body having an axis and having an inner portion adapted to be rotatably driven and an outer cutting end forming a head,
   b. the end of said head having a diametrical slot with said slot forming a pair of opposed walls,
   c. a radially extending tool bit disposed in said slot,
   d. said slot having an axial groove in one of said walls and with said groove being disposed radially outwardly from said axis and extending beyond the inner end of said tool bit,
   e. a clamp member disposed substantially wholly in said groove,
   f. and tightening means for shifting said clamp member in said groove and into engagement with said bit to lock said bit against the other of said walls opposite said groove.

2. The cutting tool of claim 1 wherein:
   a. said groove is semicircular,
   b. and said clamp member includes a pair of longitudinal edges joined by a flat surface and a semicircular surface which mates with said groove.

3. The cutting tool of claim 2 wherein:
   a. said tightening means comprises a clamp screw disposed transversely in said head, said screw having an inner end portion facing said flat surface adjacent one of said edges,
   b. and the other of said edges clampingly engages said bit when said screw is tightened.

4. The cutting tool of claim 1 which includes:
   a. a second radial tool bit disposed in said slot and spaced from said first-named bit,
   b. and adjustable seat means for said bits.

5. The cutting tool of claim 4 wherein said adjustable seat means comprises:
   a. a pair of slide plates disposed in said slot and engageable by the respective bits,
   b. said slide plates having generally aligned openings,
   c. and a cam screw extending through said head normal to said bits,
   d. said cam screw having a cam surface disposed within said aligned openings for adjusting said slide plates radially when said screw is turned.

6. The cutting tool of claim 4 wherein said adjustable seat means comprises:
   a. a pair of slide plates disposed in said slot and engageable by the respective bits,
   b. and a cam screw extending through said head axially of said tool body,
   c. said cam screw having a cam surface engageable by said slide plates for adjusting the latter radially when said screw is turned.

* * * * *